US009215365B2

(12) United States Patent
Kimoto

(10) Patent No.: US 9,215,365 B2
(45) Date of Patent: Dec. 15, 2015

(54) IMAGING APPARATUS AND IMAGING METHOD

(71) Applicant: CANON KABUSHIKI KAISHA, Tokyo (JP)

(72) Inventor: Satoshi Kimoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/331,498

(22) Filed: Jul. 15, 2014

(65) Prior Publication Data

US 2015/0022713 A1    Jan. 22, 2015

(30) Foreign Application Priority Data

Jul. 16, 2013  (JP) .................................. 2013-147467
Apr. 30, 2014  (JP) .................................. 2014-093892

(51) Int. Cl.
*H04N 5/232* (2006.01)

(52) U.S. Cl.
CPC ....... *H04N 5/23212* (2013.01); *H04N 5/23219* (2013.01)

(58) Field of Classification Search
CPC .................... G02B 7/28–7/40; H04N 5/23212
USPC .................................................. 348/351, 356
See application file for complete search history.

(56) References Cited

U.S. PATENT DOCUMENTS

2005/0128340 A1*  6/2005  Ikeda ............................ 348/345

FOREIGN PATENT DOCUMENTS

JP           5017195 B2     9/2012

* cited by examiner

*Primary Examiner* — Anthony J Daniels
(74) *Attorney, Agent, or Firm* — Canon USA, Inc. IP Division

(57) ABSTRACT

Based on a face detection result obtained from a detection unit, if a human face has not been detected, an imaging apparatus adjusts the focus state by selecting either a mountain climbing operation or a minute driving operation according to the state of the focus. If a human face has been detected, the imaging apparatus adjusts the focus state only by the minute driving operation. This achieves stable focus tracking on a target object having a low contrast, such as a human face.

11 Claims, 12 Drawing Sheets

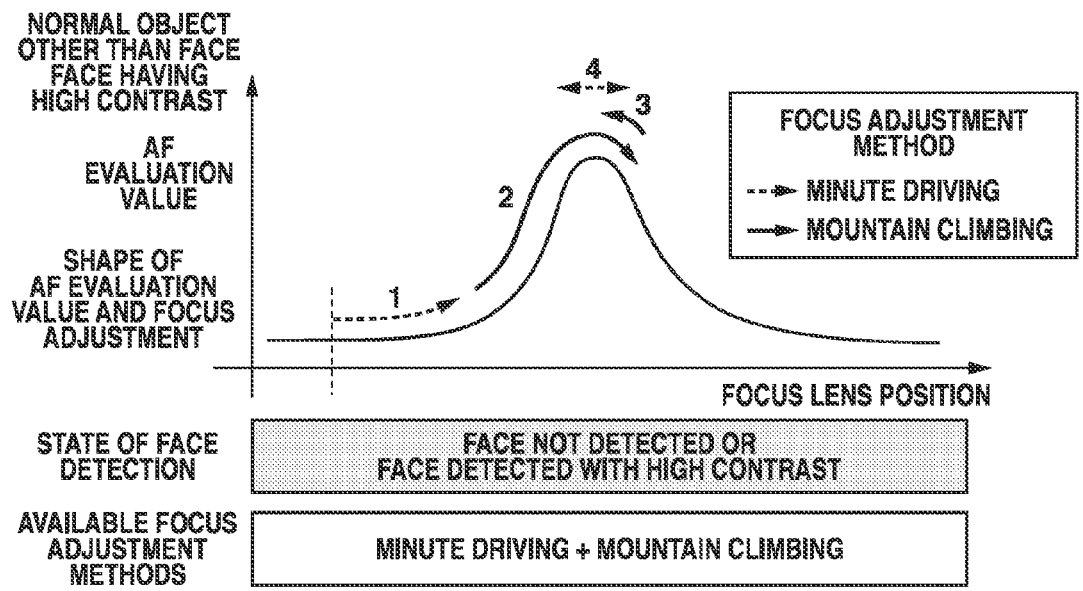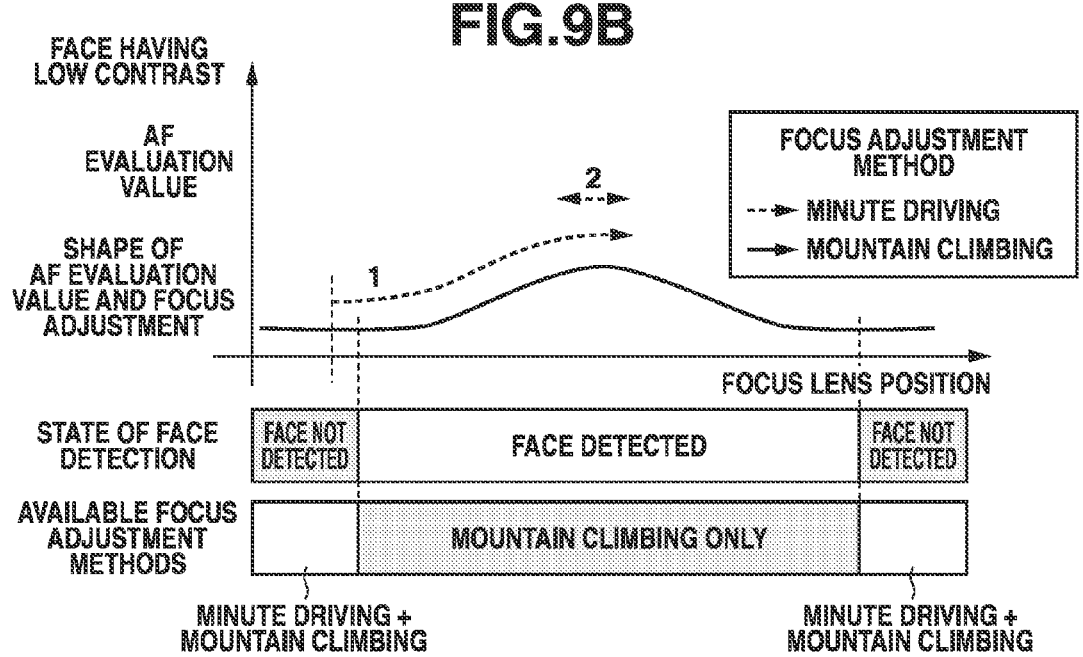

IMAGING APPARATUS AND IMAGING METHOD

BACKGROUND OF THE INVENTION

1. Field of the Invention

One disclosed aspect of the embodiments relates to an imaging apparatus and an imaging method, and in particular, relates to an imaging apparatus and an imaging method for performing automatic focus adjustment based on an image obtained by imaging.

2. Description of the Related Art

Conventionally, an autofocus device in a video camera or a digital still camera uses an image sensor to generate a focus evaluation value, which indicates the sharpness of the screen, from an image signal obtained by photoelectrically converting an object image. A mainstream method is a method of adjusting the focus by controlling the focus lens position to maximize the focus evaluation value.

In a case of capturing an image of a person, however, if the background has a higher contrast than that of the person, which is the main object, the person may be out of focus, and the background may be in focus.

To solve such a problem, an imaging apparatus including a face detection function is known. For example, there are imaging apparatuses that can set a focus detection area including the area of a detected face and perform auto-focusing (AF).

Further, a conventional focus adjustment method cannot identify an object and therefore performs the following control to achieve a desirable focusing operation on many objects. Specifically, the conventional focus adjustment method performs control so that if the focus evaluation value is large, the responsiveness is reduced on the assumption that the object may be in focus, and so that if the focus evaluation value is small, the response speed is increased on the assumption that the object may be out of focus.

Thus, for example, an object having a low contrast, such as a human face, has a low focus evaluation value even if the object is in focus as illustrated in FIG. 8. Thus, the conventional focus adjustment method may perform control to increase the response speed even if the object is in focus. This may impair the stability.

Although such a problem existed in the past, an imaging apparatus that can detect a face particularly limits the focus detection area for generating the focus evaluation value to a detected face and sets the focus detection area not to include another object to prevent the object from dropping. This makes the above phenomenon noticeable.

To solve such a problem, the following method is discussed in Japanese Patent No. 5017195. According to Japanese Patent No. 5017195, a minute driving operation is used, which drives the focus lens back and forth by a predetermined amount to determine the driving direction. A mountain climbing operation is used, which drives the focus lens in the direction in which the focus evaluation value increases by a predetermined amount in the determined driving direction. The minute driving operation and the mountain climbing operation are used to achieve a focus adjustment operation for adjusting the focus.

In the focus adjustment operation, the amount of driving of the focus lens in each operation when a face has been detected is set to be smaller than that when a face has not been detected.

Further, if the focus evaluation value obtained by the minute driving is smaller than a threshold, the operation transitions to the mountain climbing operation.

Then, the threshold is set smaller when a face has been detected than that when a face has not been detected, thereby stabilizing the focus adjustment operation even in a case of an object having a low contrast, such as a human face.

The technique discussed in Japanese Patent No. 5017195, however, has the following problem. That is, in a human face, the main factors that affect the contrast, such as the contour, the color of the skin, the features, and the hairstyle, vary from person to person. Thus, even when a human face has been detected by applying the technique discussed in Japanese Patent No. 5017195, if the detected contrast is low, the operation may transition to the mountain climbing operation, which greatly changes the focus state. This may bring the background into focus.

SUMMARY OF THE INVENTION

One disclosed aspect of the embodiments is directed to an imaging apparatus and an imaging method capable of achieving stable focus tracking even if a target object having a low contrast and varying from person to person, such as a human face, is to be focused.

According to an aspect of the embodiments, an imaging apparatus includes an image sensor configured to capture an object, an evaluation value calculation unit configured to calculate a focus evaluation value using an image signal output from the image sensor, the focus evaluation value indicating a contrast of an object image included in a focus detection area, a first focus detection unit configured to move a focus lens by a unit driving amount smaller than a predetermined threshold, thereby detecting a focus based on a change in the focus evaluation value, a second focus detection unit configured to move the focus lens by a unit driving amount equal to or greater than the predetermined threshold, thereby detecting the focus based on a change in the focus evaluation value, and an object detection unit configured to detect the object using the image signal, wherein, if the focus evaluation value is smaller than a predetermined evaluation value and the object has been detected, the focus is detected using the first focus detection unit and without using the second focus detection unit.

Further features of the disclosure will become apparent from the following description of exemplary embodiments with reference to the attached drawings.

BRIEF DESCRIPTION OF THE DRAWINGS

FIGS. 9A and 9B are diagrams each illustrating a face detection result and a focus adjustment method.

DESCRIPTION OF THE EMBODIMENTS

In an exemplary embodiment, a minute driving operation for determining a direction is the operation of moving a focus lens by a unit driving amount smaller than a predetermined threshold, thereby detecting the focus based on changes in a focus evaluation value.

In the present exemplary embodiment, a mountain climbing operation for determining an in-focus position is the operation of moving the focus lens by a unit driving amount equal to or greater than a predetermined threshold, thereby detecting focus state based on changes in the focus evaluation value.

In the present exemplary embodiment, an amplitude is an amount of driving a focus lens per unit time.

With reference to the drawings, an exemplary embodiment is described in detail below. One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, etc. One embodiment may be described by a schematic drawing depicting a physical structure. It is understood that the schematic drawing illustrates the basic concept and may not be scaled or depict the structure in exact proportions.

Overall Configuration of Imaging Apparatus

Figure 1:
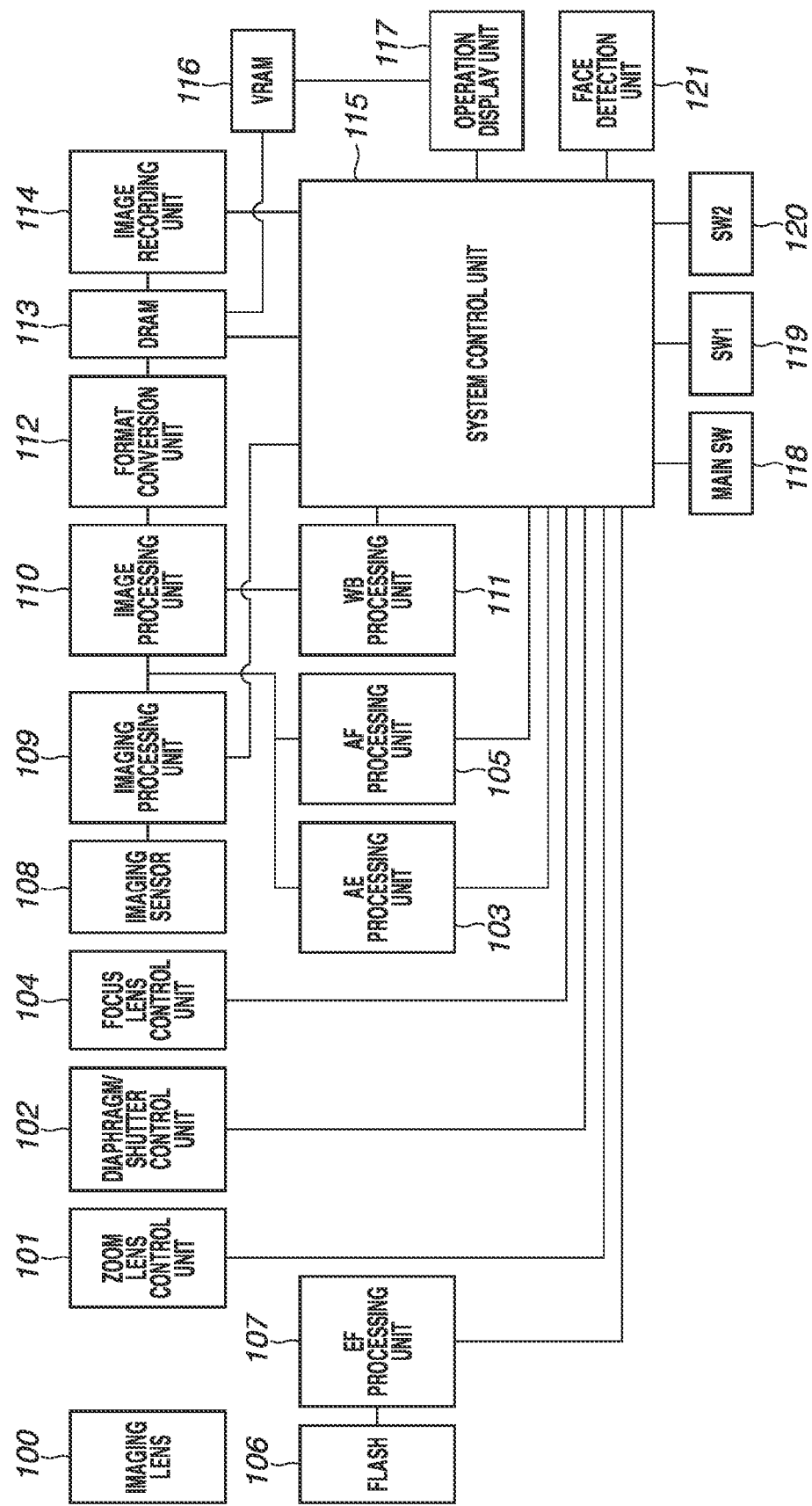
FIG. 1 is a block diagram illustrating a configuration of an entire system of an imaging apparatus.

First, the overall configuration of an imaging apparatus 1 according to the present exemplary embodiment is described. FIG. 1 is a block diagram schematically illustrating a configuration of the imaging apparatus 1 according to the present exemplary embodiment. A system control unit 115 includes, for example, a central processing unit (CPU), a random-access memory (RAM), and a read-only memory (ROM).

The system control unit 115 controls the entire operation of the imaging apparatus 1 according to the present exemplary embodiment, using the RAM as a work area according to a program stored in advance in the ROM. The various types of processing described below are performed as a computer program (software) mainly by the system control unit 115.

Further, the system control unit 115 performs an automatic focus adjustment (AF) process by detecting an in-focus position based on a focus evaluation value calculated by an AF processing unit 105, and by controlling a focus lens control unit 104 to move a focus lens. The focus evaluation value is a value that serves as an indicator of the contrast in a distance measurement area.

To an imaging lens 100 serving as an imaging optical system, a conventional and general imaging lens including a zoom function can be applied. A zoom lens control unit 101 controls the driving of a zoom lens, which changes the focal length. A diaphragm/shutter control unit 102 controls the driving of a diaphragm and a shutter, which control the amount of light. The focus lens control unit 104 controls the driving of the focus lens to adjust the focus on an image sensor 108. The zoom lens control unit 101, the diaphragm/shutter control unit 102, and the focus lens control unit 104 include optical elements (not illustrated) such as lenses, mechanisms (not illustrated) such as a diaphragm and a shutter, and various devices (not illustrated) required to drive these components.

The various devices include an actuator for driving the optical elements and the mechanisms, a circuit for controlling the actuator, and a digital-to-analog (D/A) converter. A light-emitting device (flash) 106 emits light to the outside, thereby adjusting the object luminance. If an electric flash (EF) processing unit 107 has received a "flash on" signal from the system control unit 115, the EF processing unit 107 controls the light-emitting device (flash) 106 to emit light. If the system control unit 115 has determined that it is necessary to cause the light-emitting device (flash) 106 to emit light, the system control unit 115 sends a "flash on" signal to the EF processing unit 107.

To the image sensor 108, a light-receiving unit or a photoelectric conversion unit for converting incident light into an electric signal is applied. For example, the image sensor 108 includes a photoelectric conversion device such as a charge-coupled device (CCD) imager or a complementary metal-oxide-semiconductor (CMOS) imager. The image sensor 108 can photoelectrically convert incident light to generate an image signal, and output the generated image signal.

An imaging processing unit 109 includes a correlated double sampling (CDS) circuit, a non-linear amplification circuit, and an analog-to-digital (A/D) conversion unit. The CDS circuit removes the output noise of the image sensor 108 by a correlated double sampling method. The non-linear amplification circuit amplifies (controls the gain of) an image signal from which noise has been removed by the CDS circuit. The A/D conversion unit converts an image signal, which is an analog signal, into a digital signal. The image sensor 108 and the imaging processing unit 109 function as an "imaging unit" for capturing an object image to acquire an image signal.

An image processing unit 110 performs predetermined image processing, such as gamma correction and contour correction, on an image signal (i.e., image data). Further, the image processing unit 110 performs a white balance process on an image signal based on the control of a white balance (WB) processing unit 111. A format conversion unit 112 converts a supplied image signal into a format suitable to be recorded on a recording medium by an image recording unit 114 (described below), or suitable to be displayed by an operation display unit 117 (described later).

A dynamic random-access memory (DRAM) 113 is a high-speed built-in memory (e.g., a random-access memory). The DRAM 113 is used for a high-speed buffer as a storage unit capable of temporarily storing an image signal. Further, the DRAM 113 is used as a work memory for the compression and decompression of an image signal. The image recording unit 114 can record an image signal. The image recording unit 114 includes a recording medium such as a memory card and an interface with the recording medium.

An automatic exposure (AE) processing unit 103 calculates a light metering value according to the brightness of an object, based on an image signal obtained from the imaging unit (the image sensor 108 and the imaging processing unit 109). That is, the AE processing unit 103 and the imaging processing unit 109 function as an "exposure condition detection unit" for detecting the exposure conditions when an object is captured. Further, if, for example, the object luminance is low, the AE processing unit 103 determines the amount of signal amplification (the gain amount) for amplifying an image signal to maintain correct exposure. In other words, the AE processing unit 103 determines the amount of signal amplification (the gain amount) for correcting an image signal to correct exposure.

Then, the system control unit 115 controls the diaphragm/shutter control unit 102 and the non-linear amplification circuit of the imaging processing unit 109 based on the light metering value calculated by the AE processing unit 103. The system control unit 115 thus automatically adjusts the amount of exposure. In other words, the system control unit 115 performs an automatic exposure (AE) process using the exposure conditions detected by the "exposure condition detection unit".

The AF processing unit 105 receives an input image signal and extracts through a band-pass filter (BPF) a high-frequency component of the image data that corresponds to a partial area of the screen that has been specified as an AF area.

Further, the AF processing unit 105 performs arithmetic processing such as cumulative addition, thereby calculating a focus evaluation value signal corresponding to a contour component amount on the high-frequency side.

Further, the AF area may be a center portion or a part of any portion on the screen. Alternatively, the AF area may be a center portion or any portion on the screen and a plurality of parts adjacent to this portion. Yet alternatively, the AF area may be a plurality of discretely distributed parts.

In the present exemplary embodiment, according to the detection result of a face detection unit 121, if a face has been detected, the AF area is set according to the area of the detected face. If not, the AF area of a predetermined size is set in the center of the screen. As described above, based on the focus evaluation value indicating the contrast of an object image included in a focus detection area obtained from the AF processing unit 105, the system control unit 115 controls the focus lens control unit 104, thereby performing the automatic focus adjustment (AF) process.

The system control unit 115 functions as an evaluation value calculation unit.

A video random-access memory (VRAM) (image display memory) 116 can record an image signal. An operation display unit 117 can display an image, perform display for assisting an operation, and display the state of the camera. Further, the operation display unit 117 can display an imaging screen when an image is captured.

A main switch (main SW) 118 is a switch for turning on/off the imaging apparatus 1 according to the present exemplary embodiment. A first switch (SW1) 119 is a switch for performing an imaging standby operation (an imaging preparation operation) for AF and AE. A second switch (SW2) 120 is a switch for capturing an image after the first switch 119 is operated.

The face detection unit 121 extracts feature points such as shapes, positions, and sizes of objects from an image signal, calculates the reliabilities of the objects as a human face from the result of the extraction according to a predetermined algorithm, and selects as a main object an object having a high reliability among the objects. At this time, the size, the position, and the reliability of the selected object are obtained as an output of the face detection unit 121. Examples of a known detection algorithm include a method of extracting a flesh color area based on the gray-scale color of each pixel represented by image data, and detecting a face based on the degree of matching between the extracted flesh color area and a face contour plate prepared in advance.

Further, a method of performing pattern recognition based on the extracted feature points of a face, such as the eyes, the nose, and the mouth, is known.

The present exemplary embodiment, however, is not limited to a detection algorithm, and any method may be used.

This is the overall configuration of the imaging apparatus 1 according to the present exemplary embodiment.

Basic Operation

Figure 2:
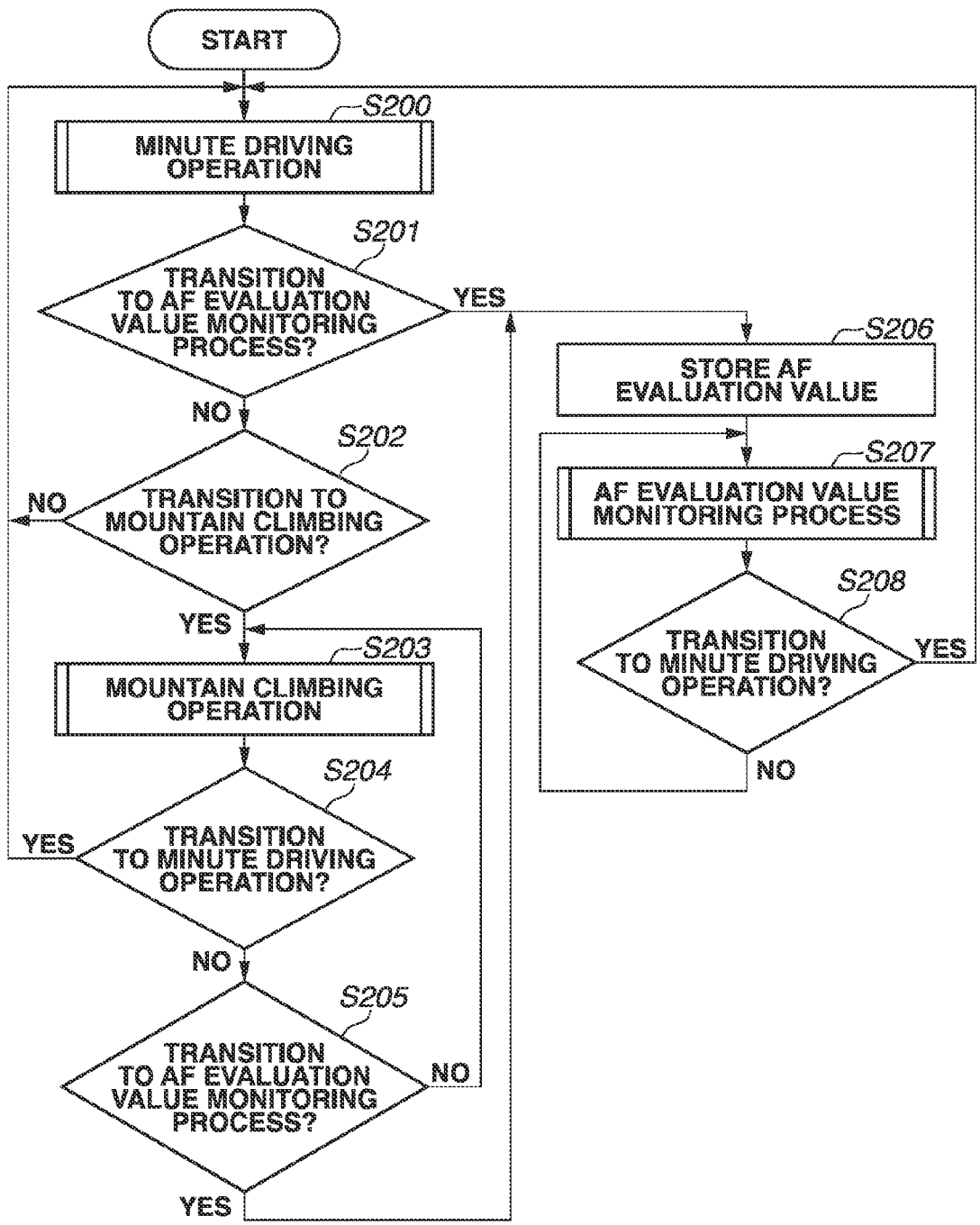
FIG. 2 is a flowchart illustrating an entire flow of a focus adjustment operation.

Next, with reference to a flowchart in FIG. 2, the entire flow of a focus adjustment operation according to the present exemplary embodiment is described.

The focus adjustment operation according to the present exemplary embodiment is continuously performed during the recording of a moving image and during a standby state. Further, the flowcharts in the present exemplary embodiment are held as a computer program (software) in the ROM of the system control unit 115. Then, after the main switch 118 has been operated to turn on and start the imaging apparatus 1 according to the present exemplary embodiment, the system control unit 115 mainly implements the flowcharts.

Next, in step S200, the system control unit 115 performs a minute driving operation. The minute driving operation is a focus adjustment method for intermittently and minutely moving the focus lens back and forth, thereby detecting the direction of the in-focus position and the in-focus position based on obtained changes in the focus evaluation value. The details will be described below. In steps S201 and S202, the system control unit 115 determines to which state the operation should transition next as a result of the execution of step S200.

More specifically, in step S201, the system control unit 115 determines whether the operation is to transition to an AF evaluation value monitoring process. In step S202, the system control unit 115 determines whether the operation is to transition to a mountain climbing operation. If it is determined in step S201 that the operation is to transition to the AF evaluation value monitoring process (YES in step S201), the processing proceeds to step S206. In step S206, the system control unit 115 stores the in-focus position detected in step S200 or the focus evaluation value at the lens position suspended as a result of the determination "out of focus", and uses the stored in-focus position or focus evaluation value in the AF evaluation value monitoring process. If it is determined in step S201 that the operation is not to transition to the AF evaluation value monitoring process (NO in step S201), the processing proceeds to step S202. If it is determined in step S202 that the operation is to transition to the mountain climbing operation (YES in step S202), the processing proceeds to step S203. If not (NO in step S202), the processing returns to step S200. In step S200, the system control unit 115 continues the minute driving operation.

Next, in step S203, the system control unit 115 performs the mountain climbing operation. The mountain climbing operation is a focus adjustment method for continuously moving the focus lens in the direction in which the focus evaluation value (AF evaluation value) increases, thereby detecting the in-focus position based on a plurality of obtained changes in the focus evaluation value.

The details thereof will be described below. In steps S204 and S205, the system control unit 115 determines to which state the operation should transition next as a result of the execution of step S203. More specifically, in step S204, the system control unit 115 determines whether the operation is to transition to the minute driving operation. In step S205, the system control unit 115 determines whether the operation is to transition to the AF evaluation value monitoring process. If it is determined in step S204 that the operation is to transition to the minute driving operation (YES in step S204), the processing returns to step S200.

If it is determined in step S204 that the operation is not to transition to the minute driving operation (NO in step S204), the processing proceeds to step S205. If it is determined in step S205 that the operation is to transition to the AF evaluation value monitoring process (YES in step S205), the processing proceeds to step S206. In step S206, the system control unit 115 stores the focus evaluation value at the lens position suspended as a result of the determination "out of focus" in step S203, and uses the stored focus evaluation value in the AF evaluation value monitoring process. On the other hand, if not (NO in step S205), the processing returns to step S203. In step S203, the system control unit 115 continues the mountain climbing operation.

Next, the AF evaluation value monitoring process in step S207 is described. The AF evaluation value monitoring process is the process of comparing a focus evaluation value stored in advance with a focus evaluation value obtained periodically, thereby monitoring the change in the focus evaluation value. The details thereof will be described below.

In step S208, the system control unit 115 determines to which state the operation should transition next as a result of the execution of step S207. If it is determined in step S208 that the operation is to transition to the minute driving operation (YES in step S208), the processing returns to step S200. On the other hand, if not (NO in step S208), the processing returns to step S207. In step S207, the system control unit 115 continues the AF evaluation value monitoring process.

As described above, the system control unit 115 of the imaging apparatus 1 according to the present exemplary embodiment continuously performs the minute driving operation, the mountain climbing operation, and the focus evaluation value monitoring process as an AF operation. Then, the system control unit 115 controls the focus lens to maintain the in-focus state according to the changes of various scenes.

Minute Driving Operation

Figure 3:
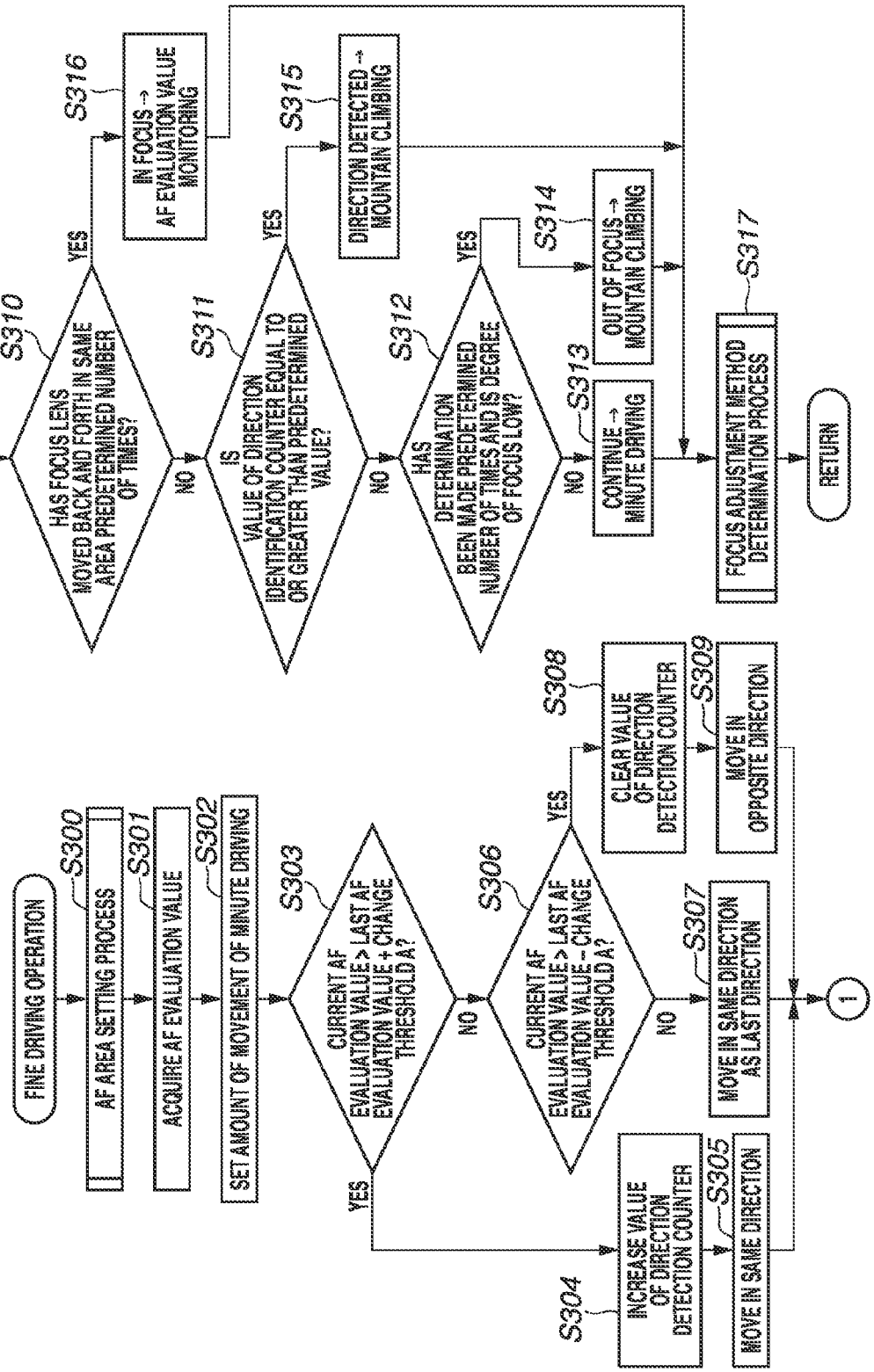
FIG. 3 is a flowchart illustrating a flow of a minute driving operation.

Next, with reference to a flowchart in FIG. 3, the minute driving operation is described.

The minute driving operation is a focus adjustment method for intermittently and minutely moving the focus lens back and forth, thereby detecting the direction of the in-focus position and the in-focus position based on obtained changes in the focus evaluation value. The minute driving operation is characterized in that the focus state changes slowly. The minute driving operation performs control with more emphasis on the stability of the focus state change than the speed until the in-focus state. Thus, the amount of driving of the minute driving operation per control cycle is set to be smaller than that of the mountain climbing operation.

Therefore, in the present exemplary embodiment, the amplitude of wobbling (back and forth movement) of the mountain climbing operation is greater than the amplitude of wobbling of a direction determination operation (the minute driving operation).

The amplitude of the minute driving operation, which is performed when the focus evaluation value is smaller than a predetermined evaluation value and an object has been detected, is greater than the amplitude of the mountain climbing operation, which is performed when the focus evaluation value is equal to or greater than the predetermined value.

First, in step S300, the system control unit 115 sets the AF area as the focus detection area used by the AF processing unit 105 to calculate the focus evaluation value. Although the details will be described below, if a face has been detected by the face detection unit 121, the system control unit 115 sets the AF area corresponding to the detected face. If a face has not been detected, the system control unit 115 sets the AF area as the focus detection area of a predetermined size in the center of the screen. Next, in step S301, the system control unit 115 acquires the focus evaluation value from the AF processing unit 105.

Next, in step S302, the system control unit 115 determines the amount of driving of minute driving. In the present exemplary embodiment, the amount of driving is determined according to the lens position, the state of the diaphragm, and the focus evaluation value. If the depth of field is large, or if the focus evaluation value is small and it is considered that the image is blurred, the amount of driving is increased.

Further, if a face has been detected by the face detection unit 121 and the focus evaluation value is smaller than a threshold determined in advance, the amount of driving (the amount of amplitude) per minute driving operation is made larger than that when the focus evaluation value is larger than the threshold. This is because, generally, the contrast of a human face tends to be low, and the focus evaluation value to be output tends to be low even in the in-focus state. The amount of driving is increased taking this into account, thereby generating a situation where a difference in level is likely to be caused in the focus evaluation value. Thus, the effect of stabilizing the focus adjustment operation near the in-focus point can be expected.

Next, in step S303, the system control unit 115 determines whether the current focus evaluation value is larger than the sum of the last focus evaluation value and a change threshold A. The change threshold A is a threshold for determining that the focus evaluation value has definitely increased. The change threshold A is set taking into account variations in the focus evaluation value based on a noise component, in addition to the actual amount of increase in the focus evaluation value. If the condition has been satisfied in step S303 and an increasing tendency of the focus evaluation value has been detected (YES in step S303), the processing proceeds to step S304. In step S304, the system control unit 115 increases the value of the direction detection counter.

The direction detection counter is used to detect the direction of the in-focus position and indicates that the larger the value of the direction detection counter, the more stably the focus evaluation value increases toward the in-focus position. Next, in step S305, the system control unit 115 moves the focus lens from the current position by the amount of driving determined in step S302. At this time, the moving direction is the same as the last direction. If, on the other hand, the focus evaluation value has not satisfied the condition in step S303 (NO in step S303), the processing proceeds to step S306.

In step S306, the system control unit 115 determines whether the current focus evaluation value is larger than the difference obtained by subtracting the change threshold A from the last focus evaluation value. In contrast to step S303, this determination detects a decreasing tendency of the focus evaluation value. If the condition has been satisfied (YES in step S306), the processing proceeds to step S308. In step S308, the system control unit 115 clears the value of the direction detection counter.

Then, in step S309, the system control unit 115 moves the focus lens from the current position in a direction opposite to the last direction by the amount of driving determined in step S302. If the condition has not been satisfied in step S306 (NO in step S306), the processing proceeds to step S307. In step S307, the system control unit 115 moves the focus lens from the current position in the same direction as the last direction by the amount of driving determined in step S302. In this case, it is not possible to detect an explicit increase or decrease in the focus evaluation value. Thus, the system control unit 115 does not operate the direction detection counter.

Figure 10:
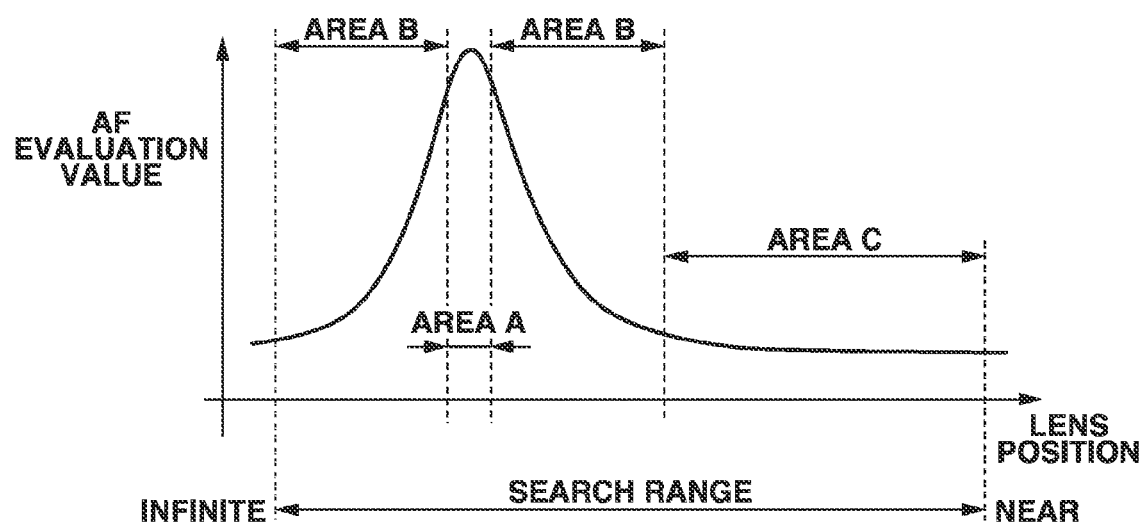
FIG. 10 is a diagram illustrating a relationship between a focus evaluation value and a lens position.

Next, in step S310, the system control unit 115 determines whether the focus lens has moved back and forth in the same area a predetermined number of times. For example, if the focus evaluation value has converged to the vicinity of the in-focus position as in an area A in FIG. 10, when the focus lens has passed through the in-focus position by the minute driving operation, the focus evaluation value decreases. Then, the moving direction of the focus lens is reversed at the next control timing.

The continuation of such an operation results in ultimately moving the focus lens back and forth across the in-focus position. Then, if the focus lens has moved back and forth in the same area the predetermined number of times (YES in step S310), the processing proceeds to step S316. In step S316, the system control unit 115 determines "in focus". As a result of this determination, the system control unit 115 sets the next state to the AF evaluation value monitoring process. If, on the other hand, it is determined that the condition has not been satisfied (NO in step S310), the processing proceeds to step S311. In step S311, the system control unit 115 determines whether the value of the direction detection counter is equal to or larger than a predetermined value. If the value of the direction detection counter is equal to or larger than the predetermined value (YES in step S311), the processing proceeds to step S315. In step S315, the system control unit 115 determines "direction detected". As a result of this determination, the system control unit 115 sets the next state to the mountain climbing operation.

Thus, the minute driving operation can not only detect the in-focus position but also function as a direction determination operation for detecting the direction of the in-focus position. The result of the direction determination is reflected on the mountain climbing operation, thereby enabling focus adjustment in which an unnecessary reverse operation is less likely to be performed and which is excellent in terms of time and appearance.

If, on the other hand, it is determined that the condition has not been satisfied (NO in step S311), the processing proceeds to step S312. In step S312, the system control unit 115 determines whether a series of processes of the minute driving operation have been performed a predetermined number of times and the degree of focus acquired in step S301 is lower than a predetermined threshold. For example, in the situation where the focus evaluation value scarcely changes as in an area C in FIG. 10, the in-focus position and the direction of the in-focus position may not be able to be detected within the predetermined number of times. This may be a case where the search range is so wide that the current position is too far away from the in-focus position to find, or a case where the actual in-focus position is present outside the search range.

In such a case, even if the minute driving operation is continued, it is difficult to find the in-focus position and the direction of the in-focus position. Thus, in this case (YES in step S312), the processing proceeds to step S314. In step S314, the system control unit 115 determines "out of focus". As a result of this determination, the system control unit 115 sets the next state to the mountain climbing operation. If, on the other hand, it is determined that the condition has not been satisfied (NO in step S312), the processing proceeds to step S313. In step S313, the system control unit 115 determines that the minute driving operation is to be continued.

As a result of this determination, the system control unit 115 continuously performs the minute driving operation without changing the next state. In the processes of steps S310 to S316, the system control unit 115 detects changes in the focus evaluation value that are obtained periodically, and outputs the determination result of the minute driving operation based on the detected changes. In step S317, a focus adjustment method determination process is performed based on the determination result. The details will be described below.

This is the minute driving operation of the imaging apparatus 1 according to the present exemplary embodiment.

Mountain Climbing Operation

Figure 4:
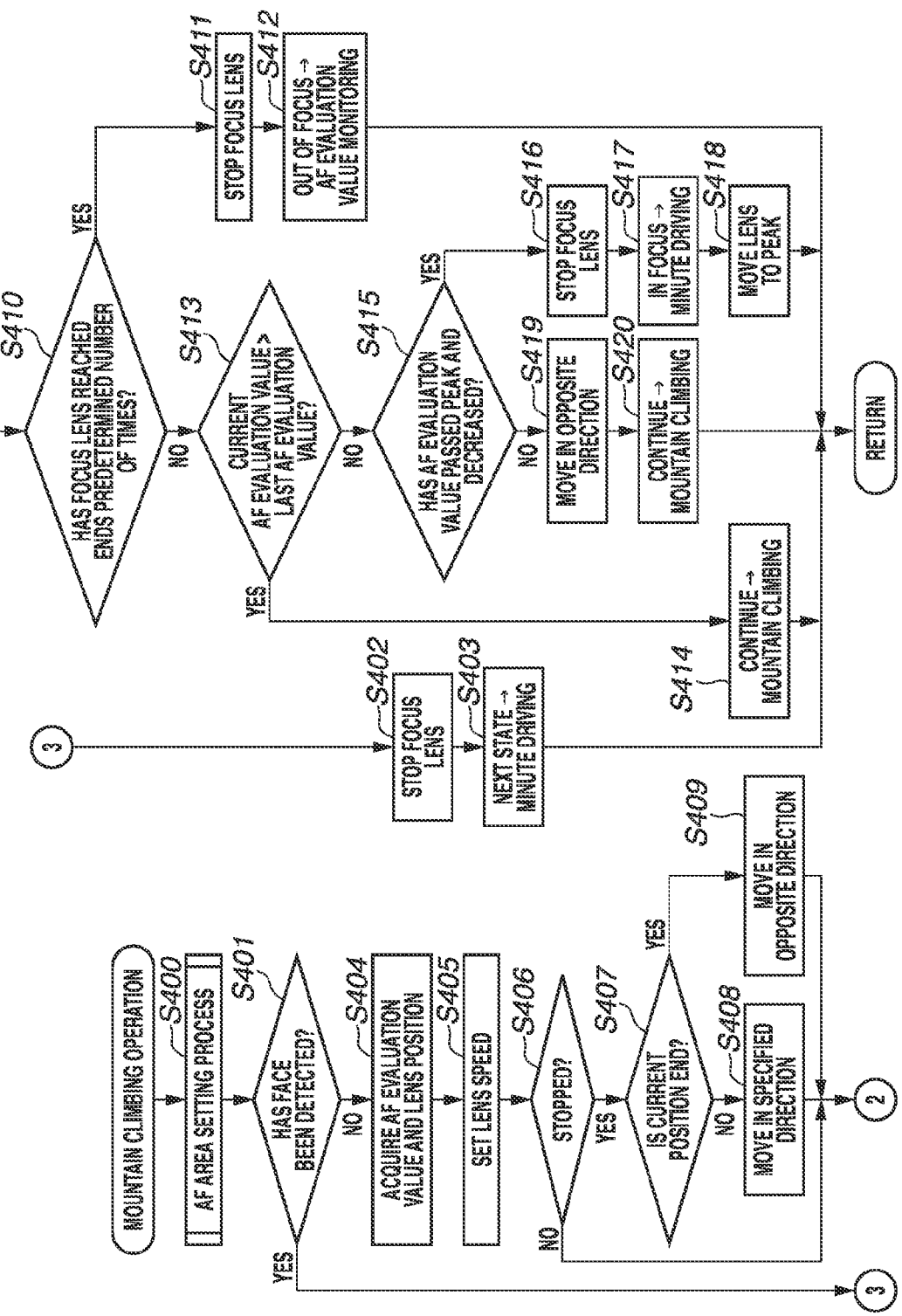
FIG. 4 is a flowchart illustrating a flow of a mountain climbing operation.

Next, with reference to a flowchart in FIG. 4, the mountain climbing operation is described.

The mountain climbing operation is a focus adjustment method for continuously moving the focus lens in the direction in which the focus evaluation value (AF evaluation value) increases, thereby detecting the in-focus position based on a plurality of obtained changes in the focus evaluation value. The mountain climbing operation is characterized in that efficient sampling of the focus evaluation value can be performed in a wide range and control with more emphasis on the speed until the in-focus state can be performed. Thus, the amount of driving (the amount of amplitude) of the mountain climbing operation per control cycle is set to be larger than that of the minute driving operation.

First, in step S400, the system control unit 115 sets the AF area used by the AF processing unit 105 to calculate the focus evaluation value. Although the details will be described below, if a face has been detected by the face detection unit 121, the system control unit 115 sets the AF area (an object detection area) corresponding to the detected face. If a face has not been detected, the system control unit 115 sets the AF area of a predetermined size in the center of the screen.

Next, in step S401, the system control unit 115 determines whether a face has been detected by the face detection unit 121. If a face has been detected (YES in step S401), the processing proceeds to step S402. In step S402, the system control unit 115 stops the focus lens. Next, in step S403, the system control unit 115 sets the state to which the operation is to transition next to the minute driving operation, and the processing ends.

If, on the other hand, a face has not been detected in step S401 (NO in step S401), the processing proceeds to step S404. In step S404, the system control unit 115 acquires the focus evaluation value and the focus lens position corresponding to the focus evaluation value. In step S405, the system control unit 115 determines the moving speed of the focus lens in the mountain climbing operation. In the present exemplary embodiment, the moving speed of the focus lens is determined according to the lens position, the state of the diaphragm, and the focus evaluation value. If the depth of field is large, or if the focus evaluation value is small and it is considered that the image is blurred, the moving speed of the focus lens is increased.

In step S406, the system control unit 115 determines whether the focus lens is stopped. At this time, the focus lens is stopped either immediately after the minute driving operation has transitioned to the mountain climbing operation, or when the focus lens has reached an end of the search range during the mountain climbing operation. If it is determined in step S406 that the focus lens is stopped (YES in step S406), the processing proceeds to step S407. If it is determined in step S406 that the focus lens is not stopped (NO in step S406), the processing proceeds to step S410.

Then, in step S407, the system control unit 115 determines whether the current lens position is an end. If it is determined in step S407 that the current lens position is an end (YES in step S407), the processing proceeds to step S409. In step S409, the system control unit 115 sets the moving direction to a direction opposite to the end and starts moving the focus lens. If, on the other hand, the condition has not been satisfied in step S407 (NO in step S407), the processing proceeds to step S408. Step S408 is performed if it is immediately after the minute driving operation has transitioned to the mountain climbing operation. The system control unit 115 starts moving the focus lens by taking over the moving direction in the minute driving operation.

Next, in step S410, the system control unit 115 determines whether the focus lens has reached the ends a predetermined number of times. If the focus lens has reached at least both ends of the search range but the in-focus position cannot be detected, the situation may be where the focus evaluation value scarcely changes as in the area C in FIG. 10 in the entire area of the search range, and the in-focus position is present outside the search range of the focus lens.

If the mountain climbing operation is continued under such conditions, large changes in the focus state are repeated. Thus, to avoid such a state, if the condition has been satisfied in step S410 (YES in step S410), the processing proceeds to step S411. In step S411, the system control unit 115 stops the focus lens. Then, in step S412, the system control unit 115 determines the result of the mountain climbing operation as "out of focus" and sets the state to which the operation is to transition next to the AF evaluation value monitoring process. If, on the other hand, the condition has not been satisfied in step S410 (NO in step S410), the processing proceeds to step S413.

In step S413, the system control unit 115 compares the current focus evaluation value with the last focus evaluation value, thereby determining whether the current value is larger than the last value. If the current value is larger than the last value (YES in step S413), the processing proceeds to step S414. In step S414, the system control unit 115 determines the result of the mountain climbing operation as "continue" and continuously performs the processing of the mountain climbing operation. In other words, in a case where an increasing tendency of the focus evaluation value can be detected, such as a case where the mountain climbing operation is being correctly performed in the actual direction of the in-focus position in one of areas B in FIG. 10, the mountain climbing operation is performed in this direction.

If, on the other hand, the condition has not been satisfied in step S413 (NO in step S413), the processing proceeds to step S415. In step S415, the system control unit 115 determines whether the focus evaluation value has passed a peak and decreased. Specifically, this corresponds to a case where the mountain climbing operation is performed from one of the areas B to the area A in FIG. 10. In this case (YES in step S415), the processing proceeds to step S416. In step S416, the system control unit 115 stops the focus lens. Then, in step S417, the system control unit 115 determines the result of the mountain climbing operation as "in focus" and sets the state to which the operation is to transition next to the minute driving operation. Then, in step S418, the system control unit 115 moves the focus lens to the position of the peak of the focus evaluation value.

If, on the other hand, the condition has not been satisfied in step S415 (NO in step S415), the processing proceeds to step S419. Specifically, this corresponds to a case where the mountain climbing operation has been performed in a direction opposite to the in-focus position in one of the areas B in FIG. 10. In step S419, the system control unit 115 reverses the moving direction of the focus lens and moves the focus lens. Then, in step S420, the system control unit 115 determines the result of the mountain climbing operation as "continue" and continuously performs the processing of the mountain climbing operation. In the processes of steps S410 to S420, the system control unit 115 detects changes in the focus evaluation value that are obtained periodically, and outputs the determination result of the mountain climbing operation based on the detected changes.

This is the mountain climbing operation of the imaging apparatus 1 according to the present exemplary embodiment.

AF Evaluation Value Monitoring Process

Figure 5:
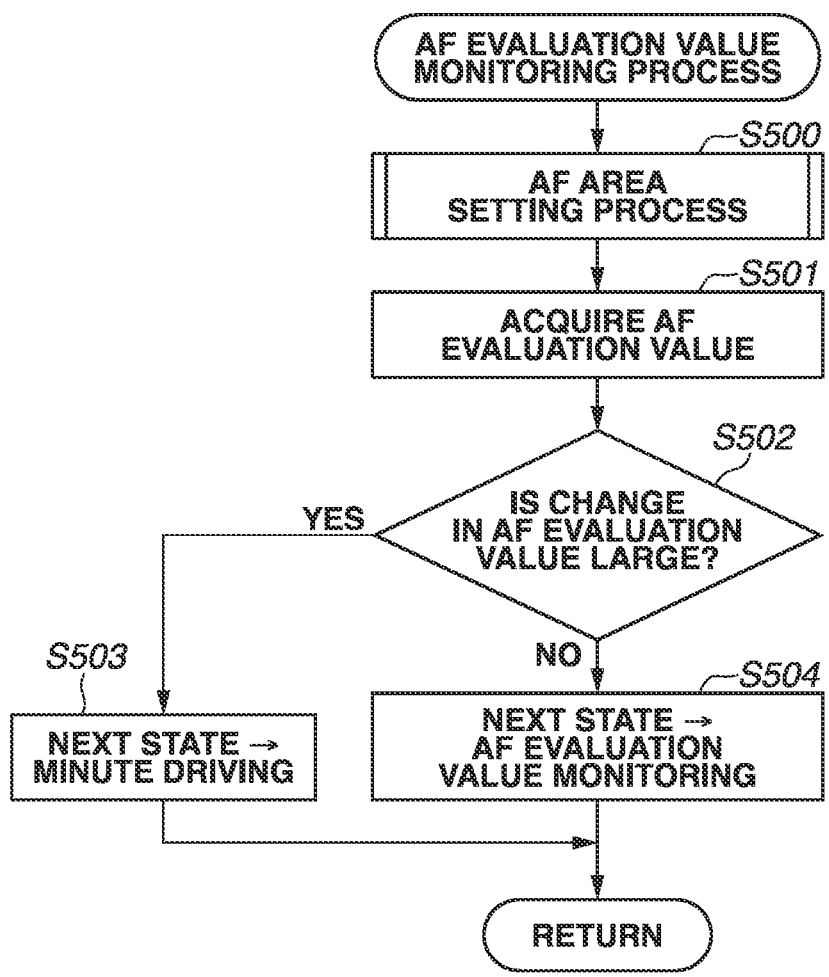
FIG. 5 is a flowchart illustrating a flow of an AF evaluation value monitoring process.

Next, with reference to a flowchart in FIG. 5, the AF evaluation value monitoring process is described.

The AF evaluation value monitoring process is a process of detecting whether the current focus evaluation value has changed relative to a focus evaluation value stored in advance.

First, in step S500, the system control unit 115 sets the AF area used by the AF processing unit 105 to calculate the focus evaluation value. Although the details will be described below, if a face has been detected by the face detection unit 121, the system control unit 115 sets the AF area corresponding to the detected face. If a face has not been detected, the system control unit 115 sets the AF area of a predetermined size in the center of the screen.

Next, in step S501, the system control unit 115 acquires the focus evaluation value. In step S502, the system control unit 115 compares the focus evaluation value stored in step S206 in FIG. 2 with the latest focus evaluation value, thereby determining whether the change in the focus evaluation value is large. If the focus evaluation value has greatly changed (YES in step S502), the processing proceeds to step S503. In step S503, the system control unit 115 sets the state to which the operation is to transition next to the minute driving operation. If the focus evaluation value has not changed in step S502 (NO in step S502), the processing proceeds to step S504. In step S504, to continue the AF evaluation value monitoring process, the system control unit 115 sets the state to which the operation is to transition next to the AF evaluation value monitoring process. As illustrated in the flow of the processes of steps S206 to S208 in FIG. 2, if the change in the focus evaluation value is small and stable, the AF evaluation value monitoring process is periodically and continuously performed.

This is the AF evaluation value monitoring process of the imaging apparatus 1 according to the present exemplary embodiment.

AF Area Setting Process

Figure 6:
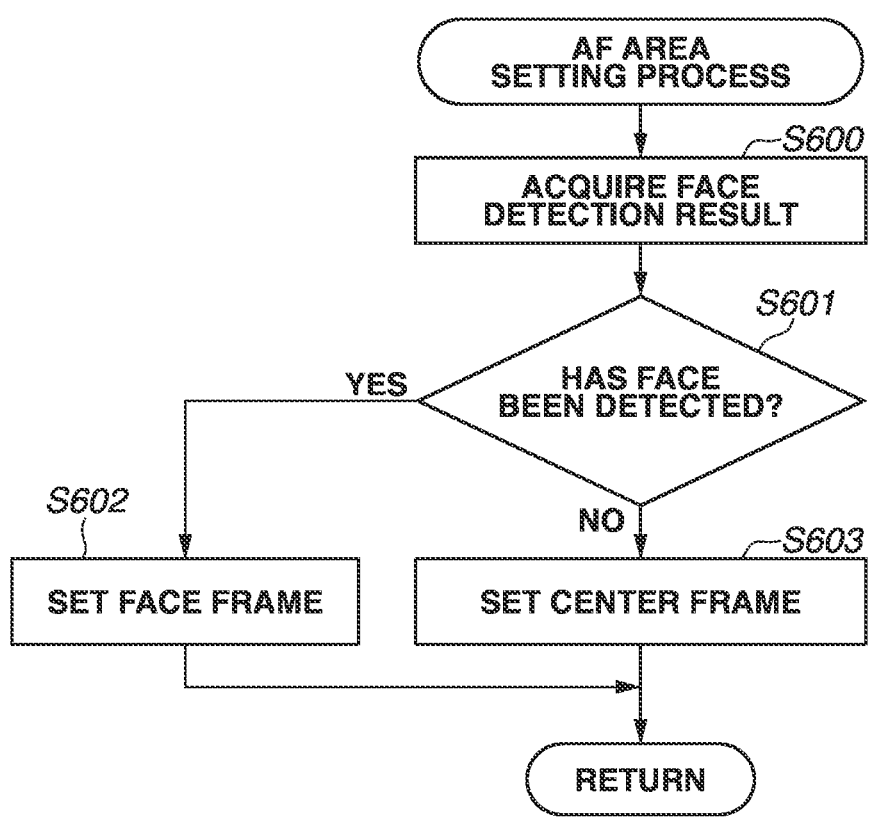
FIG. 6 is a flowchart illustrating a flow of an AF area setting process.

Next, with reference to a flowchart in FIG. 6, an AF area setting process is described.

The AF area setting process is the process of, based on an image signal input to the AF processing unit 105, setting the area of the image data that corresponds to a partial area of the screen and is to be a calculation target of the focus evaluation value.

First, in step S600, the system control unit 115 acquires the face detection result of the face detection unit 121. Next, in step S601, the system control unit 115 determines whether a face has been detected as the detection result acquired in step S600. If it is determined in step S601 that a face has not been detected (NO in step S601), the processing proceeds to step S603. In step S603, the system control unit 115 sets the AF area of a predetermined size in the center of the screen.

If, on the other hand, it is determined in step S601 that a face has been detected (YES in step S601), the processing proceeds to step S602. In step S602, the system control unit 115 sets the AF area corresponding to the area of the detected face based on the face detection result of the face detection unit 121 acquired in step S600.

As described above, in the present exemplary embodiment, the setting of the AF area is switched according to the state of face detection.

This is the AF area setting process of the imaging apparatus 1 according to the present exemplary embodiment.

Focus Adjustment Method Determination Process

Figure 7:
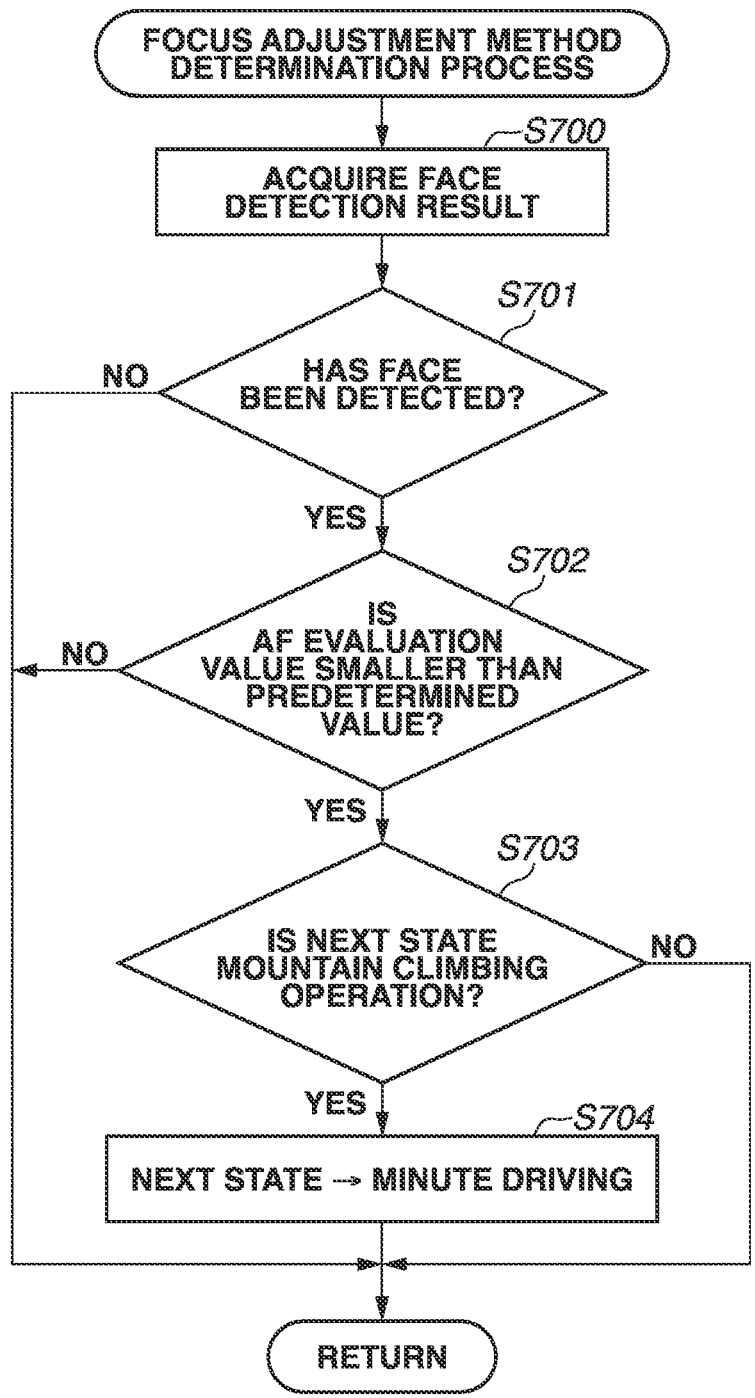
FIG. 7 is a flowchart illustrating a flow of a focus adjustment method determination process.
Figure 8:
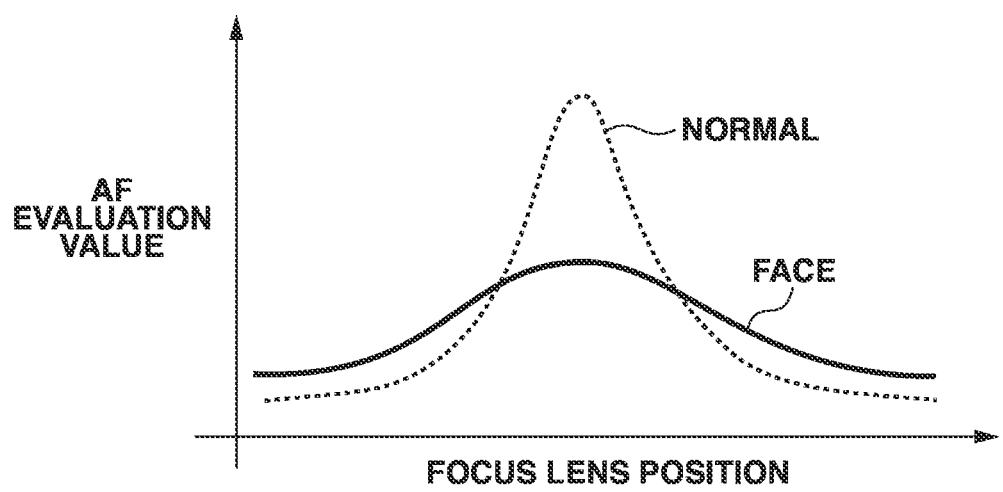
FIG. 8 is a diagram illustrating a tendency of contrast of a human face.

Next, with reference to a flowchart in FIG. 7, the focus adjustment method determination process is described.

The focus adjustment method determination process is a process of switching the focus adjustment method to be used in the focus adjustment operation, in a timely manner according to the state to which the operation is to transition next and the face detection result of the face detection unit 121.

First, in step S700, the system control unit 115 acquires the face detection result of the face detection unit 121. Next, in step S701, the system control unit 115 determines whether a face has been detected as the detection result acquired in step S700. If it is determined in step S701 that a face has not been detected (NO in step S701), the processing immediately ends. If, on the other hand, a face has been detected in step S701 (YES in step S701), the processing proceeds to step S702.

In step S702, the system control unit 115 determines whether the current focus evaluation value is smaller than a predetermined evaluation value determined in advance. If the current focus evaluation value is smaller than the predetermined value in step S702 (YES in step S702), the processing proceeds to step S703. If, on the other hand, the current focus evaluation value is equal to or larger than the predetermined value in step S702 (NO in step S702), the processing immediately ends.

In step S703, the system control unit 115 determines whether the state to which the operation is to transition next is the mountain climbing operation. If the state to which the operation is to transition next is not the mountain climbing operation (NO in step S703), the processing ends. If, on the other hand, the state to which the operation is to transition next is the mountain climbing operation (YES in step S703), the processing proceeds to step S704. In step S704, the system control unit 115 changes the state to which the operation is to transition next to the minute driving operation, and the processing ends.

Thus, in the state where a face has been detected by the face detection unit 121 and the focus evaluation value is smaller than a predetermined amount, if the mountain climbing operation is to be performed next, the processing is intentionally switched to the minute driving operation, which places emphasis on the stability of the focus change, thereby preventing the mountain climbing operation from being performed. FIGS. 9A and 9B illustrate the relationships among the shape of the focus evaluation value, the state of face detection, and the focus adjustment methods when the present exemplary embodiment is applied, in a case of a normal object other than a face (FIG. 9A) and a case of a face (FIG. 9B), separately.

When the present exemplary embodiment is applied, in the case of a normal object other than a face or the case of a face having a high contrast as in FIG. 9A, the focus state is adjusted using the minute driving operation and the mountain climbing operation in combination with each other in a timely manner according to the flowcharts in FIGS. 2 to 7. More specifically, if a face has not been detected, or if a face has been detected but the focus evaluation value is larger than the predetermined value, it is possible to use both the minute driving operation and the mountain climbing operation as a focus adjustment method. The upper graph in FIG. 9A illustrates a shape of a focus evaluation value and a focus adjustment operation, and the following operation is made as an example.

1) The minute driving operation is performed to detect the direction of the in-focus position.
2) The mountain climbing operation is performed to detect a rough in-focus position.
3) The focus lens is returned from a position where the focus lens has passed the in-focus position to the in-focus position.
4) The minute driving operation is performed near the in-focus position to detect the in-focus position.

On the other hand, also if a face has been detected and has a low contrast as in FIG. 9B, the focus state is adjusted using the minute driving operation (the wobbling operation) and the mountain climbing operation in combination with each other in a timely manner according to the flowcharts in FIGS. 2 to 7. The operation, however, is different from that in the case of a face having a high contrast or the case of a normal object other than a face.

More specifically, in the case of a face having a high contrast or the case of a normal object other than a face, it is possible to use both the minute driving operation and the mountain climbing operation as a focus adjustment method to achieve both high tracking speed and high stability.

However, in a state where a face has been detected and the focus evaluation value is smaller than the predetermined value, it is possible to use only the minute driving operation, which places emphasis on the stability of the focus change.

The upper graph in FIG. 9B illustrates a shape of the focus evaluation value and a focus adjustment operation, and the following operation is made as an example.

1) The minute driving operation is performed to detect the direction of the in-focus position. In the face detection area, however, the minute driving is continuously performed even under the conditions for performing the mountain climbing operation.
2) The minute driving operation is performed also near the in-focus position to detect the in-focus position.

The operation for adjusting the focus state is thus switched according to the state of face detection. Examples of the detection algorithm used by the face detection unit 121 may include some methods as described above.

In the present exemplary embodiment, however, the detection algorithm assumes that a determination is made based on an image signal obtained from the image sensor 108. Thus, it is considered that the detection result of the face detection unit 121 also includes the influence of the focus adjustment.

Therefore, if a face has been detected, it is presumed that the scene is a scene where feature point information, which is necessary to detect a face, can be extracted, and there is at least a certain amount of contrast.

If, on the other hand, a face has not been detected, it is presumed that the scene is a scene where a face is not present, or a face image is so blurred that feature points for detecting a face cannot be extracted.

Accordingly, in the scene where a face has been detected by applying the present exemplary embodiment, it is determined that a particular object, i.e., a human face, is present, and the contrast of the particular object tends to be lower than that of a normal object other than the object.

Thus, as a focus adjustment method, control is performed mainly through the minute driving operation with emphasis on the stability.

If, on the other hand, a face has not been detected, it is determined that a normal object other than a human face is present, or that a face is present but the image thereof is so blurred as to be unrecognizable.

Then, the focus adjustment method is switched between the minute driving operation and the mountain climbing operation in a timely manner according to the situation, thereby performing control for achieving both high tracking speed and high stability.

This is the focus adjustment method determination process of the imaging apparatus 1 according to the present exemplary embodiment.

As described above, according to the present exemplary embodiment, even if a target object such as a human face, in which the focus evaluation value of contrast, which varies from person to person, is lower than the predetermined value, is to be brought into focus, a plurality of focus adjustment methods are switched in a timely manner according to the state of the detection of the target object.

Thus, it is possible to achieve stable focus tracking.

Figure 11:
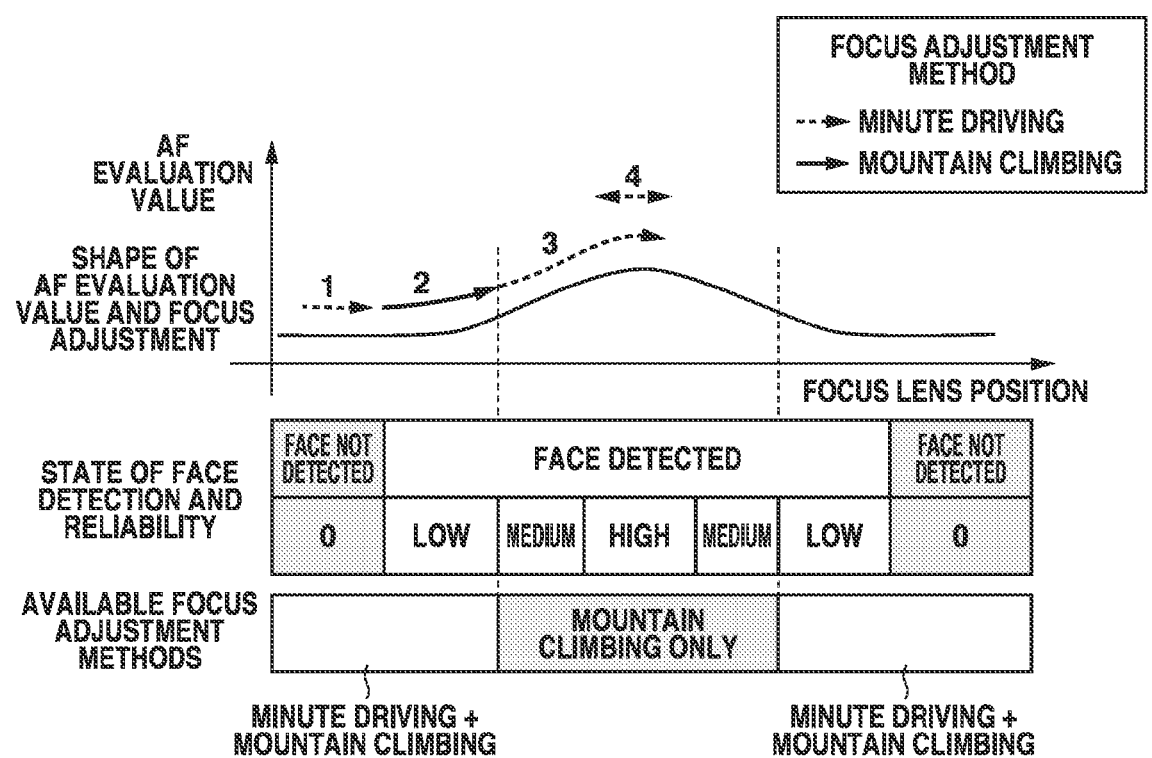
FIG. 11 is a diagram illustrating a reliability of the face detection result and the focus adjustment methods.
Figure 12:
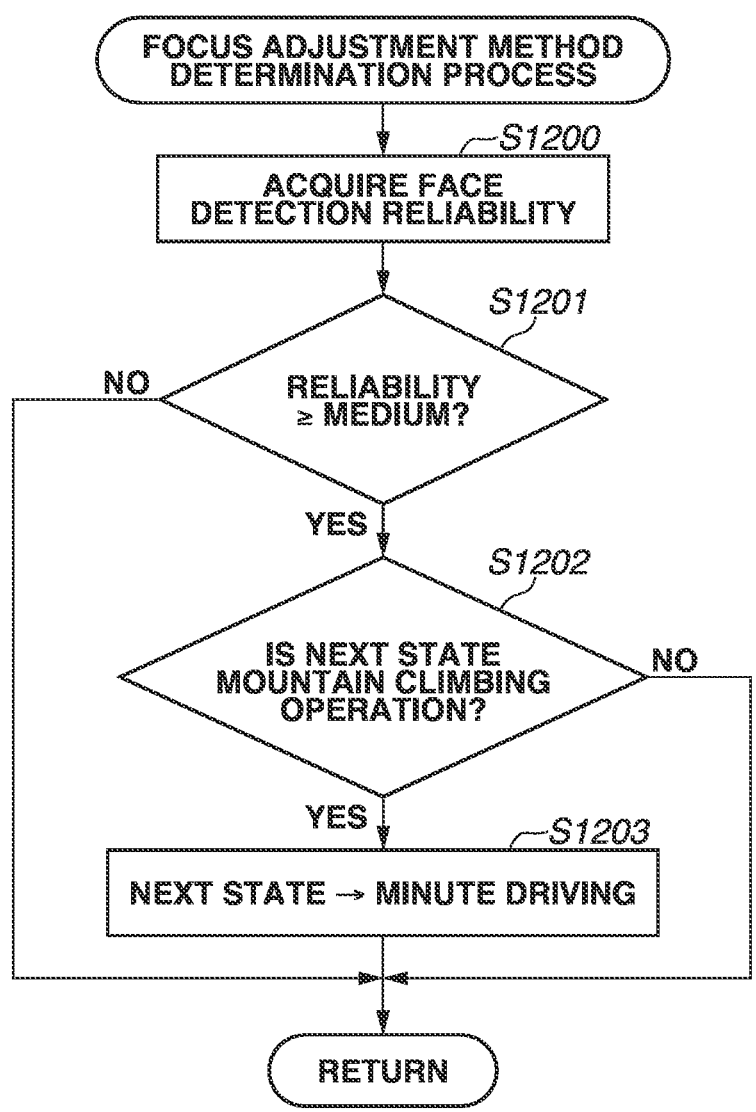
FIG. 12 is a flowchart illustrating a flow of a focus adjustment method determination process using the reliability of the face detection result.

With reference to FIGS. 11 and 12, a second exemplary embodiment is described below.

In the first exemplary embodiment, an example has been described where the focus adjustment method to be used is switched according to the face detection result of the face detection unit 121 (whether a face has been detected or a face has not been detected). In the second exemplary embodiment, an example is described where a face detection reliability, which indicates the certainty of the detected face, is used in addition to the face detection result of the face detection unit 121.

A configuration of the second exemplary embodiment is similar to that of the first exemplary embodiment, except for the flow of the AF area setting process in FIG. 6 and the part regarding the face detection result and the focus adjustment methods in FIGS. 9A and 9B. Thus, the similar configuration is not described, and the difference from the first exemplary embodiment, i.e., a focus adjustment method determination process, is described in detail.

Focus Adjustment Method Determination Process

With reference to FIG. 11 and a flowchart in FIG. 12, the focus adjustment method determination process according to the second exemplary embodiment is described.

The focus adjustment method determination process is a process of switching the focus adjustment method to be used in the focus adjustment operation, in a timely manner according to the state to which the operation is to transition next and the face detection result of the face detection unit 121.

First, in step S1200, the system control unit 115 acquires a face detection reliability, which indicates the certainty of the face detection result of the face detection unit 121. In the present exemplary embodiment, an output is obtained at the following four levels in total. More specifically, if a face has not been detected, "0" is output. Even if a face has been detected, "low", "medium", or "high" is output according to the certainty of the detected face, and the magnitude relationships among the four levels are as follows.

High>medium>low>0 (the larger, the higher reliability as a human face)

Next, in step S1201, the system control unit 115 checks the detection reliability acquired in step S1200, thereby determining whether the reliability is "medium" or above. If the reliability is below "medium" in step S1201 (NO in step S1201), the processing immediately ends. If, on the other hand, a face has been detected in step S1201 (YES in step S1201), the processing proceeds to step S1202. In step S1202, the system control unit 115 determines whether the state to which the operation is to transition next is the mountain climbing operation. If the state to which the operation is to transition next is not the mountain climbing operation (NO in step S1202), the processing ends. If, on the other hand, the state to which the operation is to transition next is the mountain climbing operation (YES in step S1202), the processing proceeds to step S1203. In step S1203, the system control unit 115 changes the state to which the operation is to transition next to the minute driving operation, and the processing ends.

Further, in step S401 in FIG. 4 of the first exemplary embodiment, the system control unit 115 determines whether a face has been detected by the face detection unit 121. In the second exemplary embodiment, however, step S401 is expanded and changed so that, similar to FIG. 12, the system control unit 115 further determines whether the face detection reliability is "medium" or above.

More specifically, in the configuration of the second exemplary embodiment, in a state where a face has been detected by the face detection unit 121 and the face detection reliability is equal to or larger than a predetermined reliability value at this time, if the mountain climbing operation is to be performed next, the processing is intentionally switched to the minute driving operation, thereby preventing the mountain climbing operation from being performed. FIG. 11 illustrates relationships among the shape of the focus evaluation value, the face detection result and the reliability of the face detection result, and the focus adjustment methods when the second exemplary embodiment is applied.

When the present exemplary embodiment is applied, as illustrated in FIG. 11, if a face has been detected but the reliability is below "medium", the focus state is adjusted using the minute driving and the mountain climbing operation in combination with each other in a timely manner. If, on the other hand, a face has been detected and the reliability is "medium" or above at this time, the minute driving is continuously performed even under the conditions for performing the mountain climbing operation. The following operation is made as an example of the operation.

1) The minute driving operation is performed to detect the direction of the in-focus position.
2) The mountain climbing operation is performed to detect a rough in-focus position.
3) If a face has been detected as the face detection result and the face detection reliability is "medium" or above, the mountain climbing operation is stopped and switched to the minute driving operation to continue detecting the in-focus position.
4) The minute driving operation is performed near the in-focus position to detect the in-focus position.

As described above, not only the determination of whether a face has been detected by the face detection unit 121, which functions as an object detection unit and a determination unit for determining the reliability of an object, but also information indicating the certainty is used as a condition for switching the focus adjustment method. Thus, for example, the threshold for the face detection reliability is switched according to the situation of imaging, such as an imaging scene or an imaging mode. Thus, it is possible to determine the switching of the focus adjustment method more finely according to the situation. Then, the focus adjustment method is switched between the minute driving operation and the mountain climbing operation in a timely manner, thereby enabling control for achieving both high tracking speed and high stability.

Further, in the present exemplary embodiment, the face detection reliability is represented by four levels. The present exemplary embodiment, however, is not limited to this. Alternatively, the face detection reliability can be represented in more detail by numerical values. Thus, control may be performed to switch the driving conditions for the minute driving operation and the mountain climbing operation, and the threshold for in-focus determination according to the value of the face detection reliability.

For example, it is also possible to set the amount of driving of the focus lens in minuter driving according to the face detection reliability. More specifically, the amount of amplitude of minute driving is set according to the face detection reliability as follows.

The face detection reliability: high>medium>low
The amount of amplitude of minute driving: small<medium<great As described above, the amount of amplitude of minute driving is set according to the face detection reliability. Thus, in an area away from the in-focus position, and the face detection reliability is low, the amount of amplitude of minute driving is set to be larger. Then, control is performed so as to give priority to the responsiveness of focus tracking. On the other hand, in an area near the in-focus position, and the face detection reliability is high, the amount of amplitude is set to be smaller. Then, control is performed to change the focus slowly and to give priority to the stability. Thus, it is possible to achieve both quick responsiveness and high stability of focus tracking in the minute driving operation.

This is the focus adjustment method determination process of the imaging apparatus 1 according to the second exemplary embodiment.

While the disclosure has been described in detail based on the exemplary embodiments, the disclosure is not limited to these specific exemplary embodiments. The disclosure also includes various forms without departing from the scope of the disclosure. Parts of the above exemplary embodiments may be appropriately combined together. Further, the disclosure also includes the case of supplying, directly from a recording medium or using wired or wireless communication, a program of software for achieving the functions of the above exemplary embodiments to a system or an apparatus including a computer capable of executing the program, thereby executing the supplied program.

Thus, a program code to be supplied and installed to a computer to achieve the functional processing of the embodiments using the computer also achieves the disclosure. That is, the embodiments also includes a computer program for achieving the functional processing of the disclosure.

In this case, it does not matter whether the form of the program is an object code, a program to be executed by an interpreter, or script data to be supplied to an operating system (OS), so long as the function of the program is included. The recording medium for supplying the program may be, for example, a hard disk, a magnetic recording medium such as a magnetic tape, an optical/magneto-optical storage medium, or a non-volatile semiconductor memory. Further, the method of supplying the program may be a method where a computer program for forming one embodiment is stored in a server on a computer network, and a client computer having connected to the server downloads and programs the computer program.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-147467 filed Jul. 16, 2013 and No. 2014-093892 filed Apr. 30, 2014, which are hereby incorporated by reference herein in their entirety.

What is claimed is:

1. An imaging apparatus comprising:
an image sensor configured to capture an object image;
an evaluation value calculation unit configured to calculate a focus evaluation value indicating a contrast of an object image included in a focus detection area, using an image signal output from the image sensor;
a first focus detection unit configured to move a focus lens by a unit driving amount smaller than a predetermined threshold to detect a focus state based on a change in the focus evaluation value;
a second focus detection unit configured to move the focus lens by a unit driving amount equal to or larger than the predetermined threshold to detect the focus state based on a change in the focus evaluation value; and
an object detection unit configured to detect the object using the image signal,
wherein, if the focus evaluation value is smaller than a predetermined evaluation value and the object has been detected, the focus state is detected using the first focus detection unit without using the second focus detection unit.

2. The imaging apparatus according to claim 1, wherein, if the focus evaluation value is equal to or larger than the predetermined value, the focus state is detected using the first focus detection unit and the second focus detection unit.

3. The imaging apparatus according to claim 1, wherein the first focus detection unit detects the focus state by moving the focus lens back and forth.

4. The imaging apparatus according to claim 1, further comprising a determination unit configured to determine a reliability of the object detected by the object detection unit, wherein, if the reliability determined by the determination unit is larger than a predetermined reliability value, the focus state is detected using the first focus detection unit without using the second focus detection unit.

5. The imaging apparatus according to claim 3, wherein when the focus state is detected using the first focus detection unit in a case where the reliability determined by the determination unit is larger than the predetermined value, an amplitude of moving the focus lens back and forth is smaller when the reliability is higher than when the reliability is lower.

6. The imaging apparatus according to claim 3, wherein an amplitude of moving the focus lens back and forth when the focus state is detected using the first focus detection unit in a case where the focus evaluation value is smaller than the predetermined value and the object has been detected, is larger than the amplitude of moving the focus lens back and forth when the focus state is detected using the first focus detection unit in a case where the focus evaluation value is equal to or larger than the predetermined value.

7. The imaging apparatus according to claim 1, wherein the detection of the focus state performed using the first focus detection unit in a case where the focus evaluation value is equal to or larger than the predetermined value is a direction determination operation for determining a moving direction of the focus lens.

8. The imaging apparatus according to claim 1, wherein the object is a face.

9. An imaging apparatus comprising:
an image sensor configured to capture an object image;
an evaluation value calculation unit configured to calculate a focus evaluation value indicating a contrast of an object image included in a focus detection area, using an image signal output from the image sensor;
a first focus detection unit configured to move a focus lens back and forth to detect a focus state based on a change in the focus evaluation value;
a second focus detection unit configured to move the focus lens in a direction in which the focus evaluation value increases, to detect the focus state; and
an object detection unit configured to detect the object using the image signal,
wherein, if the focus evaluation value is smaller than a predetermined evaluation value and the object has been detected, the focus state is detected using the first focus detection unit without using the second focus detection unit.

10. An imaging method comprising:
calculating a focus evaluation value indicating a contrast of an object image included in a focus detection area using an image signal output from an image sensor configured to capture an object image;
moving a focus lens for a first focus detection by a unit driving amount smaller than a predetermined threshold to detect a focus state based on a change in the focus evaluation value;
moving the focus lens for a second focus detection by a unit driving amount equal to or larger than the predetermined threshold to detect the focus state based on a change in the focus evaluation value; and
detecting the object using the image signal,
wherein, if the focus evaluation value is smaller than a predetermined evaluation value and the object has been detected, the focus state is detected by performing the first focus detection without performing the second focus detection.

11. An imaging method comprising:
calculating a focus evaluation value indicating a contrast of an object image included in a focus detection area using an image signal output from an image sensor configured to capture an object image;
moving a focus lens back and forth for a first detection to detect a focus state based on a change in the focus evaluation value;
moving the focus lens for a second detection in a direction in which the focus evaluation value increases, thereby detecting the focus; and
detecting the object using the image signal,
wherein, if the focus evaluation value is smaller than a predetermined evaluation value and the object has been detected, the focus state is detected by performing the first detection without performing the second detection.

* * * * *